US007482382B2

(12) United States Patent
Li et al.

(10) Patent No.: US 7,482,382 B2
(45) Date of Patent: Jan. 27, 2009

(54) PROCESS FOR PREPARING NANO-SIZED METAL OXIDE PARTICLES

(75) Inventors: Yuntao Li, The Woodlands, TX (US); Hung-Jue Sue, College Station, TX (US); Riichi Nishimura, Akashi (JP); Nobuo Miyatake, Houston, TX (US)

(73) Assignees: The Texas A&M University System, College Station, TX (US); Kaneka Corporation, Osaka (JP)

( * ) Notice: Subject to any disclaimer, the term of this patent is extended or adjusted under 35 U.S.C. 154(b) by 245 days.

(21) Appl. No.: 10/848,882

(22) Filed: May 19, 2004

(65) Prior Publication Data

US 2005/0260122 A1    Nov. 24, 2005

(51) Int. Cl.
  *C01G 9/02*    (2006.01)
  *C01G 3/02*    (2006.01)
  *C01G 23/04*   (2006.01)
  *C01G 25/02*   (2006.01)
  *C01G 49/02*   (2006.01)

(52) U.S. Cl. .................. 516/33; 423/594.1; 423/594.2; 423/594.12; 423/594.14; 423/594.16; 423/598; 423/600; 423/604; 423/608; 423/610; 423/622; 423/625; 423/632; 423/633; 423/636; 516/34

(58) Field of Classification Search ............. 423/592.1, 423/594.14, 622, 632, 635, 597.14, 594.1, 423/594.2, 594.12, 594.16, 598, 600, 604, 423/608, 610, 625, 633, 636; 516/33, 34
See application file for complete search history.

(56) References Cited

U.S. PATENT DOCUMENTS

| | | | |
|---|---|---|---|
| 4,053,577 A | 10/1977 | Arkless | 423/592.1 |
| 4,687,643 A | 8/1987 | Cortesi et al. | 422/150 |
| 4,721,610 A | 1/1988 | Yoshida et al. | 423/636 |
| 4,764,357 A | 8/1988 | Sherif et al. | 505/440 |
| 4,778,671 A | 10/1988 | Wusirika | 423/592.1 |
| 4,842,832 A | 6/1989 | Inoue et al. | 423/21.1 |
| 4,871,790 A | 10/1989 | Lamanna et al. | 523/333 |
| 4,925,704 A | 5/1990 | Sato et al. | 427/221 |
| 4,927,560 A | 5/1990 | Osaka et al. | 516/112 |
| 4,931,427 A | 6/1990 | Chien | 505/445 |
| 5,047,174 A | 9/1991 | Sherif | 516/33 |
| 5,198,025 A | 3/1993 | Dausch | 106/429 |
| 5,207,973 A | 5/1993 | Harris et al. | 266/170 |
| 5,409,683 A | 4/1995 | Tillotson et al. | 423/338 |
| 5,466,483 A | 11/1995 | Niwa et al. | 427/226 |
| 5,480,630 A | 1/1996 | Arai et al. | 423/625 |
| 5,635,154 A | 6/1997 | Arai et al. | 423/263 |
| 5,637,258 A | 6/1997 | Goldburt et al. | 292/301.4 R |
| 5,718,907 A | 2/1998 | Labarre | 424/401 |
| 5,776,360 A | 7/1998 | Sieber | 252/67.63 |
| 5,777,001 A | 7/1998 | Seeney et al. | 523/205 |
| 5,843,525 A | 12/1998 | Shibasaki et al. | 427/214 |
| 5,928,723 A | 7/1999 | Koehlert et al. | 427/213 |
| 5,962,608 A | 10/1999 | Ryang et al. | 526/89 |
| 5,994,252 A | 11/1999 | Feige et al. | 501/128 |
| 6,036,886 A | 3/2000 | Chhalora et al. | 252/301.4 R |
| 6,071,486 A | 6/2000 | Koehlert et al. | 423/335 |
| 6,077,640 A | 6/2000 | Komai et al. | 430/108.3 |
| 6,107,396 A | 8/2000 | Kweon et al. | 524/779 |
| 6,139,816 A | 10/2000 | Liu et al. | 423/608 |
| 6,169,119 B1 | 1/2001 | Ryang et al. | 516/90 |
| 6,171,580 B1 | 1/2001 | Katsuyama et al. | 424/59 |
| 6,200,680 B1 * | 3/2001 | Takeda et al. | 428/402 |
| 6,235,270 B1 | 5/2001 | Ishii et al. | 424/59 |
| 6,303,091 B1 | 10/2001 | Mohri et al. | 423/263 |
| 6,328,947 B1 | 12/2001 | Monden et al. | 423/611 |
| 6,329,058 B1 | 12/2001 | Arney et al. | 428/403 |
| 6,395,341 B1 | 5/2002 | Arakawa et al. | 427/419.1 |
| 6,432,526 B1 | 8/2002 | Arney et al. | 428/328 |
| 6,476,098 B1 | 11/2002 | Arakawa et al. | 523/206 |
| 6,503,475 B1 | 1/2003 | McCormick et al. | 423/592.1 |
| 6,527,825 B1 | 3/2003 | Gruenbauer et al. | 75/362 |
| 6,710,091 B1 * | 3/2004 | Womelsdorf et al. | 516/33 |

FOREIGN PATENT DOCUMENTS

JP    11217511    8/1999
JP    2003147090    5/2003

OTHER PUBLICATIONS

Eva M. Wong et al., "ZnO quantum particle thin films fabricated by electrophoretic deposition," *Applied Physics Letters*, vol. 74, No. 20, May 17, 1999, pp. 2939-2941.

Tito Trindade et al. , "Nanocrystalline Semiconductors: Synthesis, Properties, and Perspectives," *Chem. Mater*, 2001, 13, pp. 3843-3858.

Detlef W. Bahnemann et al., "Preparation and Characterization of Quantum Size Zinc Oxide: A Detailed Spectroscopic Study," *J. Phys. Chem.*, 1987, 91, pp. 3789-3798.

(Continued)

*Primary Examiner*—Wayne Langel
*Assistant Examiner*—James Fiorito
(74) *Attorney, Agent, or Firm*—Gardere Wynne Sewell LLP; Jennifer S. Sickler (57) ABSTRACT

The present invention is directed to novel sol-gel methods in which metal oxide precursor and an alcohol-based solution are mixed to form a reaction mixture that is then allowed to react to produce nanosized metal oxide particles. The methods of the present invention are more suitable for preparing nanosized metal oxide than are previously-described sol-gel methods. The present invention can provide for nanosized metal oxide particles more efficiently than the previously-described sol-gel methods by permitting higher concentrations of metal oxide precursor to be employed in the reaction mixture. The foregoing is provided by careful control of the pH conditions during synthesis and by ensuring that the pH is maintained at a value of about 7 or higher.

22 Claims, 10 Drawing Sheets

OTHER PUBLICATIONS

Th. Agne et al., "Doping of the nanocrystalline semiconductor zinc oxide with the donor indium," *Applied Physics Letters*, vol. 83, No. 6, Aug. 11, 2003, pp. 1204-1206.

Eric A. Meulenkamp, "Synthesis and Growth of ZnO Nanoparticles," *J. Phys. Chem. B*, 1998, 102, pp. 5566-5572.

Mikrajuddin Abdullah, et al., "In Situ Synthesis of Polymer Nanocomposit Electrolytes Emitting a High Luminescence with a Tunable Wavelength" cont'd J. Phys. Chem B 2003, 107, pp. 1957-1961.

H.A. Ali, et al., "Properties of self-assembled ZnO nanostructures", Solid-State Electronics 46 (2002) pp. 1639-1642.

* cited by examiner

PROCESS FOR PREPARING NANO-SIZED METAL OXIDE PARTICLES

TECHNICAL FIELD

The present invention relates in general to metal oxide particles, and in particular, to methods of preparing nanometer-sized metal oxide particles.

BACKGROUND INFORMATION

Nanocrystalline semiconductors and oxides have attracted a great deal of research interest in recent years due to their fundamental importance in bridging the gap between bulk matter and molecular species. See A. P. Alivisatos, "Perspectives on the Physical Chemistry of Semiconductor Nanocrystals," *J. Phys. Chem.*, 100, 13226-13239, (1996); A. S. Edelstein and R. C. Cammarata, *Nanomaterials: Synthesis, Properties and Applications*, Eds. Institute of Physics Publishing: Bristol, 1996. As a result of quantum confinement effects, nanosized metal oxide particles can possess electronic bandgaps that are larger than the corresponding bulk material. Furthermore, the bandgap of these quantum-confined nanosized metal particles can be tuned within the nano-sized regime by changing and/or mixing the particle sizes. See L. Li et al., "Band Gap Variation of Size- and Shape-Controlled Colloidal CdSe Quantum Rods," *Nano Letters*, 1, 349-351 (2001). The tunable optoelectronic properties of such nanosized metal oxide particles will likely provide them with performance characteristics that far surpass conventional metal oxide particles possessing sizes on the order of micrometers.

Current research efforts in the area of nanocrystalline semiconductors and oxides are driven, to a great extent, by the many applications in which such nanosized particles are expected to find use. Such applications include novel optical, electrical, and mechanical devices, photovoltaic solar cells, light-emitting diodes, varistors, light catalysts, gas sensors, optoelectronic devices, optical switches, UV absorbers, nano-lasers, ion-insertion batteries, electrochromic devices, etc. See A. S. Edelstein and R. C. Cammarata, *Nanomaterials: Synthesis, Properties and Applications*, Eds. Institute of Physics Publishing: Bristol, 1996; B. O'Regan and M. Grätzel, "A Low-Cost, High-Efficiency Solar Cell Based on Dye-Sensitized Colloidal $TiO_2$ Films," *Nature*, 353, 737-740 (1991); M. A. Fox and M. T. Dulay, "Heterogeneous Photocatalysis," *Chem. Rev.*, 93, 341-357 (1993); V. L. Colvin, M. C. Schlamp and A. P. Alivisatos, "Light-Emitting Diodes Made from Cadmium Selenide Nanocrystals and a Semiconducting Polymer," *Nature* 370, 354-357 (1994); J. Lee, J.-H. Hwang, J. J. Mashek, T. O. Mason, A. E. Miller and R. W. Siegel, "Impedance Spectroscopy of Grain Boundaries in Nanophase ZnO," *J. Mater. Res.*, 10, 2295-2300 (1995); M. H. Huang, S. Mao, H. Feick, H. Yan, Y. Wu, H. Kind, E. Weber, R. Russo and P. Yang, "Room-Temperature Ultraviolet Nanowire Nanolasers," *Science*, 292, 1897-1899 (2001). Indeed, such nano-sized particles have already found commercial application in sunscreens and cosmetics as the active UV absorbing ingredient (U.S. Pat. No. 6,171,580 to Katsuyama et al.).

The breadth of potential applications available for nanosized metal oxide particles has fueled additional research into their synthesis and manufacture. Nanosized metal oxide particles can presently be produced by a variety of methods, including chemical gas phase growth methods such as chemical vapor deposition (CVD) and metal-organic chemical vapor deposition (MO-CVD), molecular beam epitaxial methods, and plasma synthesis methods. See U.S. Pat. No. 5,128,081 to Siegel et al. and U.S. Pat. No. 6,580,051 to Peterson et al. These methods, however, require expensive and complex equipment. On the other hand, sol-gel methods can produce nanosized metal oxide particles at relatively low temperatures with relatively inexpensive equipment, as compared to the above-mentioned methods. As a result, these sol-gel methods have gained popularity in recent years.

Zinc oxide (ZnO) is a particularly interesting metal oxide material from which nano-sized metal oxide particles can be made. ZnO, which is one of the few wide-bandgap semiconducting oxides that shows quantum confinement effects in an experimentally accessible size range, is a simple, stable species that, when obtained in clusters known as nanocrystals (quantum dots) with diameters below about 7 nm, has unique physical, chemical and optical properties not observed in the corresponding bulk solid. These quantum size effects, combined with the large surface area-to-mass of the dots, make ZnO nanoparticles highly desirable when seeking to exploit such quantum confinement in applications ranging from optics to high strength materials to data storage. Moreover, compared with other wide-bandgap semiconductors, ZnO has a very high exciton binding energy of 60 meV as a light emitter; GaN, by comparison, is 25 meV. For electronic applications, its attractiveness lies in having a high breakdown strength and high saturation velocity. ZnO is also much more resistant to radiation damage than other common semiconductor materials, such as Si, GaAs, CdS, and even GaN. See D. C. Look, "Recent Advances in ZnO Materials and Devices," *Materials Science and Engineering*, B80, 383-387 (2001).

As with the preparation of other nanosized metal oxide particles, there are many methods developed to prepare nanosized ZnO, such as chemical vapor deposition, molecular beam epitaxy, metal-organic vapor-phase epitaxy and colloid preparation. The colloidal (sol-gel) preparation is widely used among these approaches because it is easy to perform. The seminal paper describing the synthesis of ZnO nanoparticles using a sol-gel method is: Bahnemann et al., "Preparation and Characterization of Quantum Size Zinc Oxide: A Detailed Spectroscopic Study," *J. Phys. Chem.*, 91, 3789-3798 (1987). This paper describes a method whereby ZnO nanoparticles are formed by the addition of a metal hydroxide species to a zinc acetate-alcohol solution. Subsequent to such disclosure, highly concentrated ZnO particles, with particle sizes in the range of 2-7nm, were obtained using a sol-gel method involving the addition of metal hydroxide to a zinc acetate-alcohol solution, as described in Meulenkamp, "Synthesis and Growth of ZnO Nanoparticles," *J. Phys. Chem. B*, 102, 5566-5572 (1998). This work further describes a method for monitoring particle size by optical absorption and luminescence spectroscopy, whereby ZnO particle size was found to be dependent on reaction time and temperature. This method, however, additionally leads to the formation of large particles when carried out under high concentrations of the metal oxide precursor (e.g., ~0.1M).

Wong et al. have studied the kinetics involved in ZnO nanoparticle growth [E. M. Wong, J. E. Bonevich and P. C. Searson, "Growth Kinetics of Nanocrystalline Particles from Colloidal Suspensions," *J. Phys. Chem. B*, 102, 7770-7775 (1998)], as well as the effect of organic capping ligands on such ZnO nanoparticle growth [E. M. Wong, P. G. Hoertz, C. J. Liang, B. M. Shi, G. J. Meyer and P. C. Searson, "Influence of Organic Capping Ligands on the Growth Kinetics of ZnO Nanoparticles," *Langmuir*, 17, 8362-8367 (2001)]. However, this method is time consuming and gives very low yields in terms of the relative concentration of ZnO in the resulting sol.

Highly concentrated ZnO colloids have been prepared using a sol-gel synthesis developed by L. Spanhel and M. A. Anderson in 1991 [L. Spanhel and M. A. Anderson, "Semiconductor Clusters in the Sol-Gel Process: Quantized Aggregation, Gelation, and Crystal Growth in Concentrated ZnO Colloids," *J. Am. Chem. Soc.*, 113, 2826-2833 (1991)]. According to that procedure, a $Zn^{2+}$ precursor was prepared by refluxing a $Zn(OAc)_2.2H_2O$-ethanol solution, followed by the addition of $LiOH.H_2O$ powder into the solution. E. A. Meulenkamp modified this method by using a $LiOH.H_2O$-ethanol solution and lowering the reaction temperature to 0° C. See E. A. Meulenkamp, *J. Phys. Chem. B*, 102, 5566-5572 (1998).

Based on current understanding, the growth of ZnO nanocrystal clearly depends on reaction time, temperature and the stoichiometry of the reactants. However, the detailed reaction mechanism is not yet clear. It has been claimed that the use of other bases, such as KOH, NaOH, $Mg(OH)_2$, and other alcohols, such as methanol and propanol, failed to achieve desirable results. See L. Spanhel and M. A. Anderson, *J. Am. Chem. Soc.*, 113, 2826-2833 (1991). In addition, low temperature processing is not favored for some in situ organic material-based nanocomposite preparations. Consequently, there is a demonstrated need to address the above-mentioned problems and uncertainties.

As a result of the above-described state of the art, it would be highly desirable to find a novel sol-gel method that can produce nanosized metal oxide particles at high concentrations without the co-formation of large (non-nanosized) particles. Additionally, any such method(s) capable of producing nanosized ZnO would be especially desirable.

SUMMARY OF THE INVENTION

The present invention is directed to novel sol-gel methods in which metal oxide precursor and an alcohol-based solution are mixed to form a reaction mixture that is then allowed to react to produce nanosized metal oxide particles. The methods of the present invention are more suitable for preparing nanosized metal oxide than are previously-described sol-gel methods. The present invention can provide for nanosized metal oxide particles more efficiently than the previously-described sol-gel methods by permitting higher concentrations of metal oxide precursor to be employed in the reaction mixture.

In some embodiments of the present invention, the above-described alcohol-based solution generally comprises a basic species operable for maintaining the alcohol-based solution and the ensuing reaction mixture at a pH of 7 or more. In some embodiments, the basic species is one that is a source of hydroxyl ions. In some embodiments, it is further desirable to limit the pH of the reaction mixture to a range with a minimum of 7 and a maximum of about 10.5.

In some embodiments of the present invention, in addition to the basic species described above, the alcohol-based solution generally comprises a $C_1$-$C_6$ alcohol. Typically, the basic species is dissolved in this alcohol solvent. Additionally, there may be additional components to the alcohol-based solution. Such components include, but are not limited to, water and one or more organic species.

Suitable metal oxide precursors, according to some embodiments of the present invention, include, but are not limited to, metal acetates, metal alkoxides, metal nitrates, metal halides, hydrates thereof, and combinations thereof. While numerous metal-containing species can be used as a metal oxide precursor, according to the present invention, an exemplary metal oxide precursor, i.e., one for making nanosized metal oxide particles according to the present invention, is zinc acetate dihydrate, $Zn(C_2H_3O_2)_2.2H_2O$.

The present invention provides for producing nanosized metal oxide particles with average diameters in the 1-100 nm size regime. In some embodiments, these nanosized metal oxide particles are quantum-confined. According to some embodiments of the present invention, such average particle diameter of the produced nanoparticles can be modulated by adjusting reaction parameters, particularly temperature and reaction duration, but also the ratio of metal oxide precursor to the basic species within the reaction mixture. In some embodiments, these nanosized metal oxide particles are stored as a sol—often at temperatures that preclude their agglomeration.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention is directed to novel sol-gel methods in which metal oxide precursor and an alcohol-based solution are mixed to form a reaction mixture that is then allowed to react to produce nanosized metal oxide particles. The methods of the present invention are more suitable for preparing nanosized metal oxide than are previously-described sol-gel methods. The present invention can provide for nanosized metal oxide particles more efficiently than the previously-described sol-gel methods by permitting higher concentrations of metal oxide precursor to be employed in the reaction mixture.

While most of the terms used herein will be recognizable to those of skill in the art, the following definitions are nevertheless put forth to aid in the understanding of the present invention. It should be understood, however, that when not explicitly defined, terms should be interpreted as adopting a meaning presently accepted by those of skill in the art.

A "metal oxide," according to the present invention, is a material comprising a metal component and an oxygen component, wherein the stoichiometric ratio of the metal component to the oxygen component is dependent upon the type of metal and on its oxidation state.

A "colloid" or "colloidal suspension," according to the present invention, is a suspension of small particles, generally in a solvent medium, wherein the particles do not settle out as a result of their small size. Such a colloidal suspension is also referred to as a "sol." A "sol-gel process" is one that involves a the transition of a system from a liquid, mostly colloidal, "sol" into a mostly solid "gel" phase. Sol-gel methods are widely used in the formation of ceramic materials.

"Nanosized" or "nanoscale," according to the present invention, generally means something comprising at least one dimension less than 100 nanometers (nm). "Nanoparticles," as defined herein, are particles with at least two dimensions below 100 nm. Thus, such nanoparticles include "nanorods." Typically, the more spherical-like particles exhibit isotropic properties, whereas the more rod-like particles tend to exhibit anisotropic properties.

"Bandgap," as used herein in reference to a semiconductor material, refers to the minimum amount of energy necessary for an electron to transfer from the valence band of the material into the conduction band, where it moves more freely.

"Quantum confinement," as used herein, refers to semiconducting or wide bandgap materials that have had their dimensions reduced below that of their Bohr exciton radius, thereby increasing their bandgap. Semiconducting particles with "quantum confined" dimensions are often referred to as "quantum dots" or "Q-particles."

Generally, the present invention is a process comprising a first step of preparing an alcohol-based solution, a second step of adding a metal oxide precursor to the alcohol-based solution to form a reaction mixture, and a third step of reacting the reaction mixture to form nanosized metal oxide particles.

In some embodiments of the present invention, the above-described alcohol-based solution generally comprises a basic species operable for maintaining the alcohol-based solution and the ensuing reaction mixture at a pH of 7 or more. In some embodiments, it is further desirable to limit the pH of the reaction mixture to a range with a minimum of 7 and a maximum of about 10.5.

In some embodiments, the basic species is one that is a source of hydroxyl ions, but such basic species can generally be any species that provides for a alcohol-based solution and reaction mixture pH of at least about 7. Such basic species include, but are not limited to, LiOH, NaOH, KOH, $NH_4OH$, hydrates thereof, and combinations thereof. Such basic species are typically dissolved in the alcohol-based solution in a molar concentration generally between about 0.002M and about 2.0M, and specifically between about 0.01M and about 0.4M.

In some embodiments of the present invention, in addition to the basic species described above, the alcohol-based solution generally comprises a $C_1$-$C_6$ alcohol. Such alcohols include, but are not limited to, methanol, ethanol, n-propanol, isopropanol, and combinations thereof. Typically, the basic species is dissolved in this alcohol solvent. Additionally, there may be additional components to the alcohol-based solution. Such components include, but are not limited to water and organic species. Suitable organic species, according to the present invention, include, but are not limited to, acetone, methylethyl ketone, tetrahydrofuran, benzene, toluene, o-xylene, m-xylene, p-xylene, mesitylene, diethyl ether, dichloromethane, chloroform, and combinations thereof. Apart from the alcohol, the basic species and/or additional (optional) components may comprise as much as about 50 weight percent of the resulting alcohol-based solution, but typically less than 30 weight percent.

Suitable metal oxide precursors, according to some embodiments of the present invention, can be any metal oxide precursor that reacts to form nano-sized metal oxide precursors according to the present invention. Such metal oxide precursors include, but are not limited to, metal acetates, metal alkoxides, metal nitrates, metal halides, hydrates thereof, and combinations thereof. In some embodiments, such metal oxide precursors generally comprise a metal component selected from the group consisting of Group IIA metals, Group IIIA metals, Group IVA metals, Group VA metals, transition metals, lanthanide metals, actinide metals, and combinations thereof In some of these embodiments, nanosized metal oxide particles comprise a metal selected from the group consisting of Al, Ti, Fe, Cu, Zn, Ba, Zr, and combinations thereof. While numerous metal-containing species can be used as a metal oxide precursor, according to the present invention, an exemplary metal oxide precursor, for making nanosized metal oxide particles according to the present invention, is zinc acetate dihydrate, $Zn(C_2H_3O_2)_2 \cdot 2H_2O$, wherein the zinc acetate dihydrate represents a metal acetate species comprising a zinc (metal) component. In some embodiments, the metal oxide precursor is a solid at room temperature, whereas in other embodiments, it is a liquid or gas at room temperature. In some embodiments, the metal oxide precursor is in the form of a powder.

As described above, the metal oxide precursor is added to the alcohol-based solution to form a reaction mixture. In some embodiments, the metal oxide is added to the alcohol-based solution as a powder. In other embodiments, the metal oxide precursor is first dissolved in an alcohol or other solvent, then added to the alcohol-based solvent of the present invention. Such addition may occur with a range of addition rates and within a range of temperatures suitable for such addition, and it may involve stirring or some other type of suitable agitation process—all such that they provide for nanosized metal oxide particles in accordance with the present invention. In some embodiments, one or more particular atmospheric conditions may be used, e.g., a nitrogen blanket or some other type of inert atmospheric environment. Generally, the molar ratio of the metal oxide precursor species to the basic species within the reaction mixture is between about 1:1.2 and about 1:3.

In reacting the reaction mixture to form nanosized metal oxide particles, reaction conditions suitable for the formation of such particles need to be maintained. Such reaction conditions typically involve a reaction temperature, a reaction duration, an agitation means, and, optionally, an inert reaction atmosphere. Reaction temperatures, according to the present invention, range generally from at least about 0° C. to at most about 100° C., specifically from at least about 20° C. to at most about 80° C., and more specifically from at least about 30° C. to at most about 80° C. Reaction durations, according to the present invention, range generally from about a few seconds to about a few days, and more specifically from about a few minutes to about a few days. Agitation methods include, but are not limited to, stirring, shaking, sonicating, vibrating, and combinations thereof. In some embodiments of the present invention, one or more dopant species are added to the reaction mixture such that doped nanosized metal oxide particles are formed as a result. In some embodiments, such dopant species are used to modulate the electrical and/or optical properties of the resulting nanosized metal oxide particles. Suitable dopant species include, but are not limited to, Cu, Ni, Ir, and combinations thereof. Doped nanosized ZnO particles, made by a different process, have been described previously. See Agne et al., "Doping of the nanocrystalline semiconductor zinc oxide with the donor iridium," Appl. Phys. Lett., 83(6), 1204-1206 (2003).

The present invention provides for nano-sized metal oxide particles with average diameters generally in the 1-100 nm size regime. In some embodiments, however, the nanosized metal oxide particles have average diameters in the 1-50 nm, or even 1-10 nm, size regimes. In some embodiments, these nanosized metal oxide particles are quantum confined. According to some embodiments of the present invention, such average particle diameter can be modulated by adjusting reaction parameters, particularly temperature and reaction duration, but also the ratio of metal oxide precursor to the basic species within the reaction mixture. In some embodiments, these nanosized metal oxide particles are stored as a colloidal suspension or sol—often at temperatures that preclude their agglomeration. In some or other embodiments, volatile solvent is removed and the nano-sized metal oxide particles are stored as a gel.

The following Examples are provided to demonstrate particular embodiments of the present invention. It should be appreciated by those of skill in the art that the methods disclosed in the Examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention. Note that for all Examples, the average diameter of the nanosized metal oxide particles produced was generally estimated via UV-vis absorption spectroscopy, according to the techniques described in Meulenkamp, "Synthesis and Growth of ZnO Nanoparticles," J. Phys. Chem. B, 102, 5566-5572 (1998). Such estimation involved calibration with standard metal oxide samples for which transmission electron microscopy was used to confirm average particle diameter.

EXAMPLE 1

This Example serves to illustrate a route, according to the present invention, of preparing ZnO colloids that is simpler and more general than those previously described in the literature.

Chemicals and solvents described in this and subsequent Examples were of reagent grade and used without further purification. Deionized water was used for pH measurements. pH measurements were made with a Beckman φ340 pH meter using a combined glass electrode with an operating range up to about pH 14, manufactured by Corning. UV-vis absorption spectra were recorded using either a HP 8451 diode-array spectrophotometer or a Shimadzu UV-1601 spectrophotometer. Spectra from the colloids were obtained with 1 cm quartz cells. Methanol was used as the reference solvent. Fluorescence spectra were recorded using a SLM Aminoco MC200 spectrofluorometer.

ZnO particle size was determined using a JEOL JEM-2010 TEM (transmission electron microscope) operating at 200 kV. Samples were prepared by placing a drop of colloidal solution to a copper mesh covered with a carbon film. The excess liquid was removed after 30 seconds and the sample grid was allowed to dry by evaporation in air.

For a typical synthesis, 50 ml of 0.04 M KOH in methanol (alcohol-based solution) was prepared and heated at 60° C. with stirring. To this alcohol-based solution was subsequently added 0.22 g (1 mmol) of $Zn(OAc)_2 \cdot 2H_2O$ (zinc acetate dihydrate) powder under reflux and stirring. Thus, the reaction stoichiometry of the zinc acetate dehydrate to the KOH in the reaction mixture was 1:2 (0.02 M vs. 0.04 M). The reaction mixture was divided into three portions after 30 minutes of reaction time. One was aged at −10° C., one was aged at 25° C. with stirring, and the remaining one was aged and stirred at 60° C.

Figure 1:
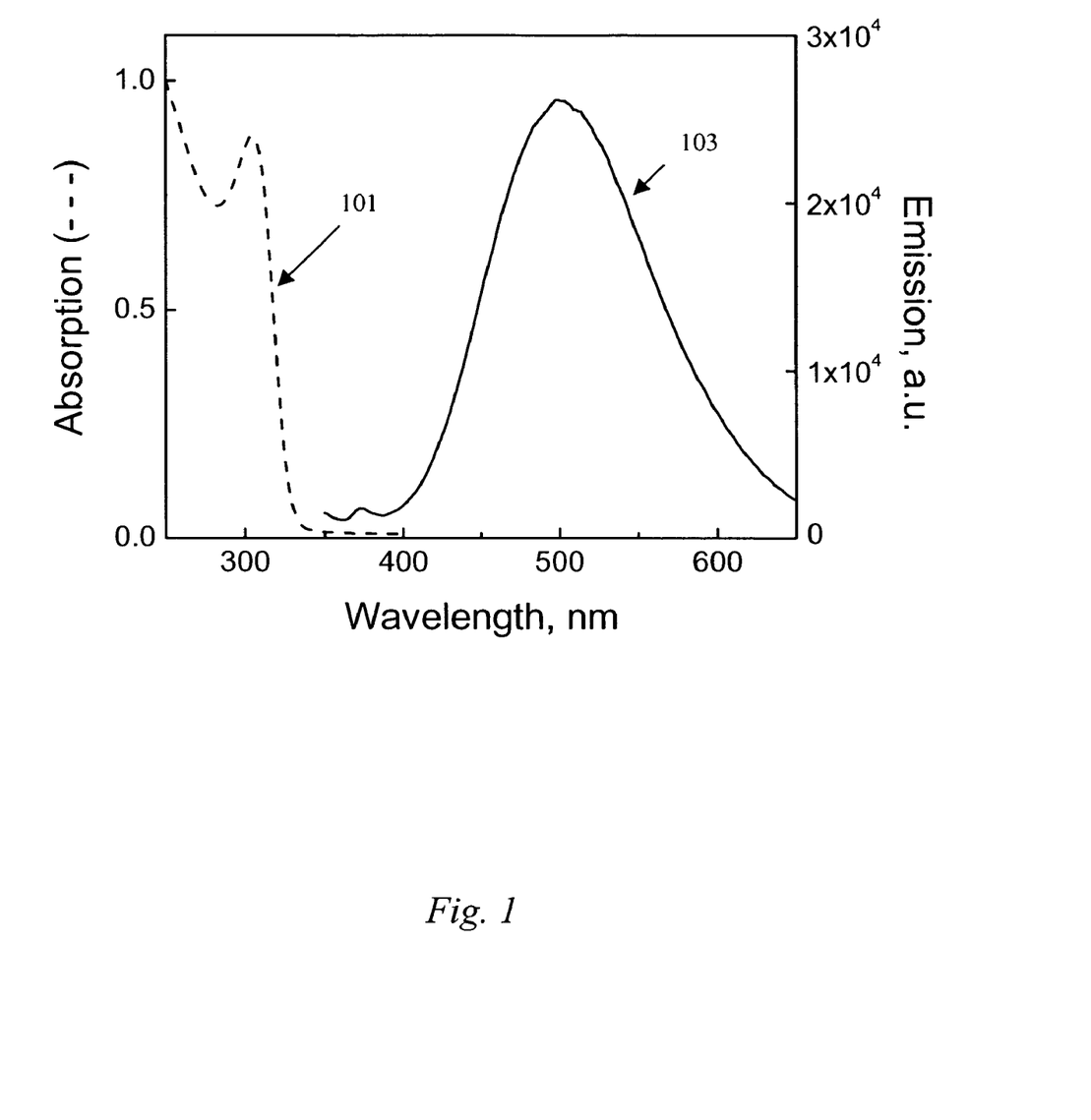
FIG. 1 depicts both the absorption and emission spectra of a ZnO colloid, synthesized at 60° C. for 30 minutes, according to an embodiment of the present invention.
Figure 2:
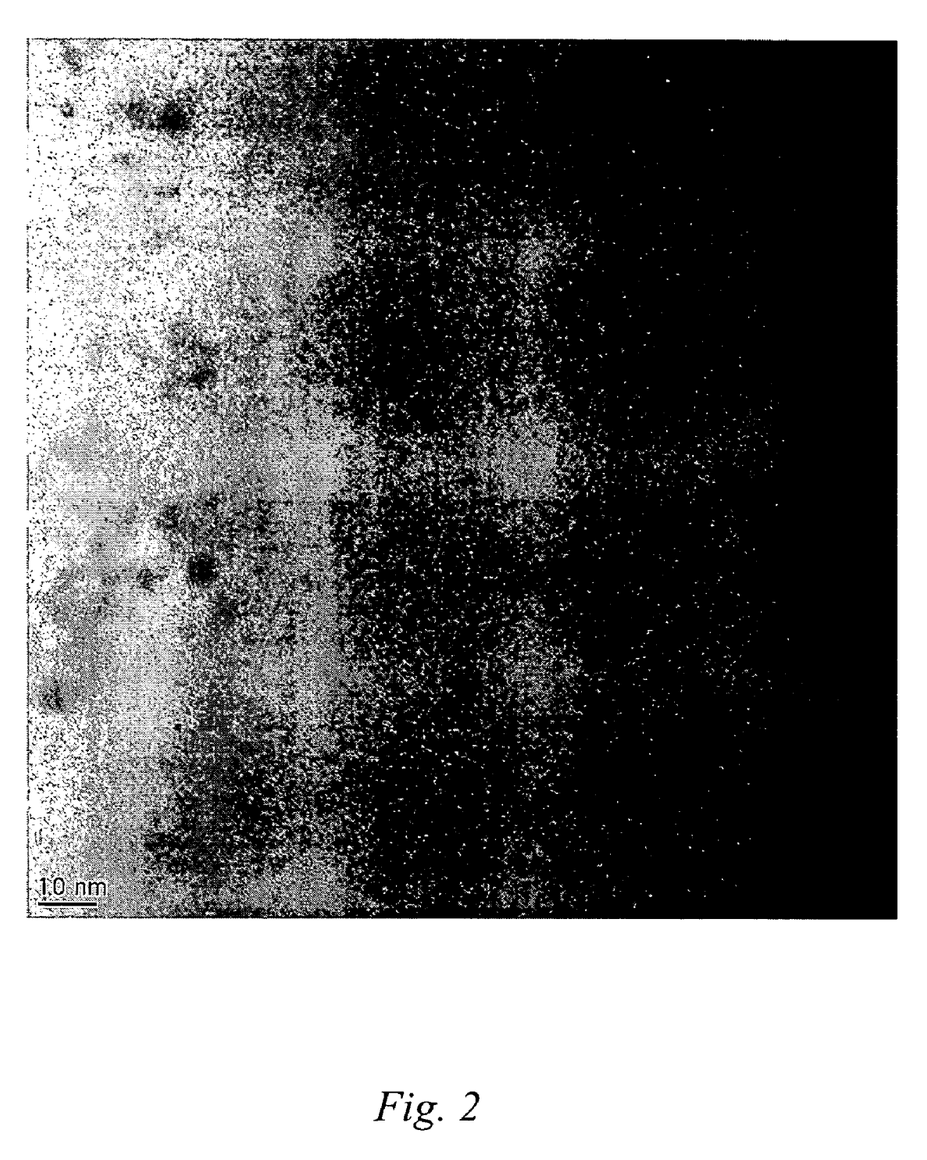
FIG. 2 depicts a transmission electron micrograph of a ZnO colloid, synthesized at 60° C. for 30 minutes, according to an embodiment of the present invention.

A white precipitate was observed to have formed immediately after adding Zn(OAc)2.2H2O powder to the alcohol-based (KOH/methanol) solution. The precipitation was then observed to dissolve within about 5 minutes, and a transparent ZnO colloidal solution was formed. The absorption and fluorescence spectra of ZnO colloids, obtained after about 30 minutes of stirring at 60° C., are shown in FIG. 1, wherein the absorption spectrum is designated as trace 101 and the fluorescence spectrum is designated as trace 103. An onset of absorption (determined by the linear extrapolation of the steep part of the UV absorption toward the baseline) is observed at $\lambda os=328$ nm. Two emission peaks are observed, in agreement with those usually reported from experiments on ZnO quantum dots. See, for example, L. Spanhel and M. A. Anderson, J. Am. Chem. Soc., 113, 2826-2833 (1991); E. A. Meulenkamp, J. Phys. Chem. B, 102, 5566-5572 (1998); A. Van Dijken, E. A. Meulenkamp, D. Vanmaekelbergh and A. Meijerink, J. Lumin., 87, 454 (2000). One of these emission peaks is a broad green luminescent band around 500 nm (2.35 eV), while another is a much weaker ultraviolet emission band around 380 nm (3.25 eV). FIG. 2 shows a transmission electron micrograph from the above ZnO colloidal solution. The diameter of the nanosized metal oxide particles produced was determined to be around 3 nm.

The resulting ZnO colloid was divided into three portions after about 30 minutes of reaction. One portion continued to be stirred at 60° C. and was turbid after 18 hours of reaction. One portion continued to be stirred at 25° C. and remained transparent even after two weeks. Finally, one was stored at −10° C. and was still transparent even after several months. This confirms that particle growth rates are highly dependent on aging temperature. The ZnO nanoparticles grow very quickly and tend to aggregate at high temperatures. The detailed growth kinetics will be discussed in a subsequent Example. Note that different hydroxides, such as NaOH and LiOH, and different alcohols such as ethanol and isopropanol, were used in place of KOH/methanol and confirm the variability of the above-described synthesis method.

EXAMPLE 2

This Example serves to illustrate how the reactions described in EXAMPLE 1 are effected by different concentrations of KOH and different reaction stoichiometries of zinc acetate dehydrate and KOH. Toward this end, the pH values of the resulting solution and reaction mixtures were measured, and the absorption spectra of the solution and reaction mixtures were monitored, to verify whether or not ZnO colloids were formed for a particular set of reaction parameters. The experimental data is shown in Table 1 wherein "initial" refers to the KOH/methanol solution before having added the zinc acetate dihydrate, "5 min" refers to the reaction mixture at 60° C.-5 minutes after having added the zinc acetate dihydrate, and "2 h" refers to the reaction mixture at 60° C.-2 hours after having added the zinc acetate dihydrate. As can be seen in the Table, Zn(OAc)$_2$.2H$_2$O, in the presence of a 50% stoichiometric amount of KOH, yields stable ZnO colloids when methanol is the solvent, no matter if the concentration of KOH is 0.02 or 0.04 M. The pH values of both resulting ZnO colloids obtained are in the range of about 8-9. The colloid formation followed the phenomenon described in EXAMPLE 1, wherein a white precipitate formed at the beginning of the reaction and then dissolved, followed by the formation of transparent ZnO colloids. However, if the stoichiometric ratio of zinc acetate dehydrate and KOH is 0.01M to 0.04M, neither white precipitate nor ZnO colloids was formed. The pH of the solution obtained in such a manner after 2 hours of reaction was 11.6.

TABLE 1

The pH value of solutions with different concentration of zinc acetate dihydrate and KOH

| Concentration | | | | | ZnO |
|---|---|---|---|---|---|
| Zinc acetate | KOH | pH (initial) | pH (5 min) | pH (2 h) | colloids |
| 0.01 M | 0.02 M | 12.07 | 8.58 | 8.45 | Yes |
| 0.02 M | 0.04 M | 12.24 | 9.60 | 8.77 | Yes |
| 0.015 M | 0.04 M | 12.24 | 10.83 | 10.69 | No |
| 0.01 M | 0.04 M | 12.24 | 11.74 | 11.62 | No |
| 0.2 M | 0.4 M | 13.33 | 9.10 | 8.81 | Yes |

Stoichiometry of reactive species and pH are thus shown to have a strong effect on ZnO colloid synthesis. It has been reported that the most stable ZnO colloids result from a stoichiometric ratio of zinc acetate and NaOH that is 1:1.25, with isopropanol as the solvent. See D. W. Bahnemann, C. Kormann and M. R. Hoffmann, J. Phys. Chem., 91, 3789-3798 (1987). In this report, the highest coagulation of the colloidal particles appeared at pH 9.2 for their aqueous ZnO sols. In the sol-gel synthesis reported by Anderson [L. Spanhel and M. A. Anderson, J. Am. Chem. Soc., 113, 2826-2833 (1991)] and Meulenkamp [E. A. Meulenkamp, J. Phys. Chem. B, 102, 5566-5572 (1998)], the stoichiometric ratio of Zn(OAc) 2.2H2O and LiOH.H2O are both 1:1.4.

While not intending to be bound by theory, oxides are believed to be formed by hydrolysis (1) and condensation (2) of the reactive species (C. J. Brinker and G. W. Scherer, Sol-gel Science, Academic Press. San Diego, 1990):

(1)

(2)

For such sol-gel reactions, a higher pH induces faster condensation, and vice versa, in accordance with the higher growth rate [E. A. Meulenkamp, J. Phys. Chem. B, 102, 5566-5572 (1998)]. However, based on the observation disclosed in the present Example, wherein the white precipitate was formed at the beginning of the reaction and then dissolved, such indications imply the formation and dissociation of Zn(OH)2. The ZnOH species in the reaction mixture during the reaction are suggested to be: ZnOH+, Zn(OH)2, Zn(OH)3– and Zn(OH)42–. If the reaction mixture has a high pH, i.e., pH is more than about 11 and the stoichiometric amount of OH– is much greater than that of the zinc acetate, then the soluble Zn(OH)3– and Zn(OH)42– species are dominant and their dissociation to ZnO is not favorable. Therefore, in such situations, no ZnO colloid is formed. However, when the stoichiometric ratio of hydroxide to zinc acetate dihydrate is between 1 and 2, the pH of the solution is around 7-9. In such circumstances, the species ZnOH+, Zn(OH)2 are dominant and are easily dissociated to yield ZnO.

Different hydroxides, such as NaOH, LiOH, and different alcohols, such as ethanol and isopropanol, can also be used in lieu of the base and alcohol selections in the synthesis method described above. In carrying out such substitutions, a similar phenomenon was observed and transparent ZnO colloidal solutions were obtained as well, though the dissolution of LiOH in the alcohols tended to be relatively slow. The above results clearly show the synthesis of stable, transparent ZnO colloids in various systems by a very simple route.

ZnO nanoparticles continue to grow after synthesis. The growth process can be monitored by absorption and emission spectra. The system described in EXAMPLE 3 for particle growth is zinc acetate dihydrate with KOH in methanol.

EXAMPLE 3

This Example serves to illustrate how optical spectroscopy can be used to both size the nanosized metal oxide product of the present invention, as well as its ability to serve as a means of monitoring the synthesis, growth, and aging of such product.

UV/Vis Absorption Spectra

Figure 3:
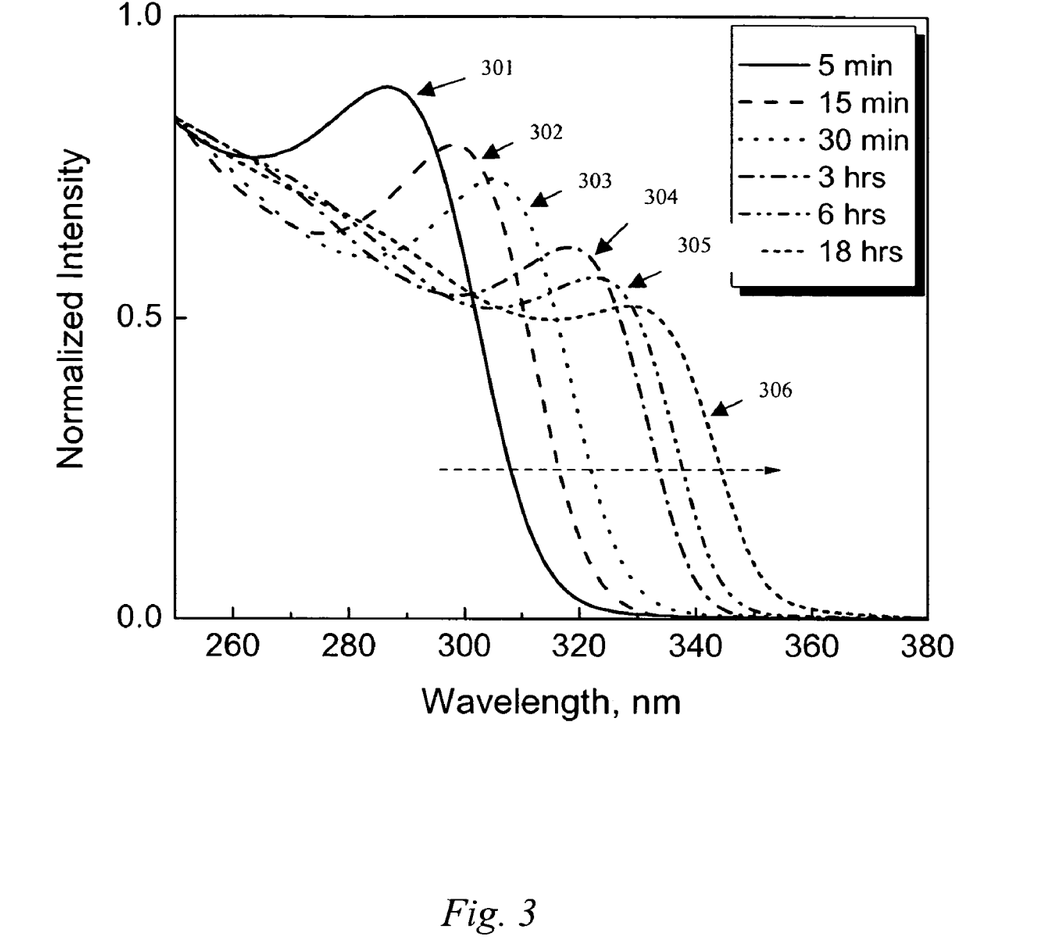
FIG. 3 depicts UV-vis absorption spectra of ZnO colloid aged at 60° C., according to an embodiment of the present invention.

ZnO exhibits quantum size effects for particles ≦7 nm. See U. Koch, A. Fojtik, H. Weller and A. Henglein, "Photochemistry of Semiconductor Colloids. Preparation of Extremely Small ZnO Particles, Fluorescence Phenomenoa and Size Quantization Effects," Chem. Phys. Lett. 122, 507-510 (1985). Therefore, optical absorption spectra provide a convenient way to investigate ZnO nanoparticle growth within this quantum-confined size region. In the present Example, UV-vis absorption spectra were recorded at various times during the preparation of a stable transparent ZnO colloid prepared at 60° C. These spectra are shown in FIG. 3, wherein trace 301 corresponds to 5 minutes, trace 302 to 15 minutes, trace 303 to 30 minutes, trace 304 to 3 hours, trace 305 to 6 hours, and trace 306 to 18 hours. As can be seen in FIG. 3, an onset of absorption, λos=314 nm, is observed after mixing the zinc acetate dihydrate with the base solution for 5 minutes. The λos becomes progressively red shifted toward 355 nm while being continuously heated and stirred for 18 hours at 60° C.

Figure 4:
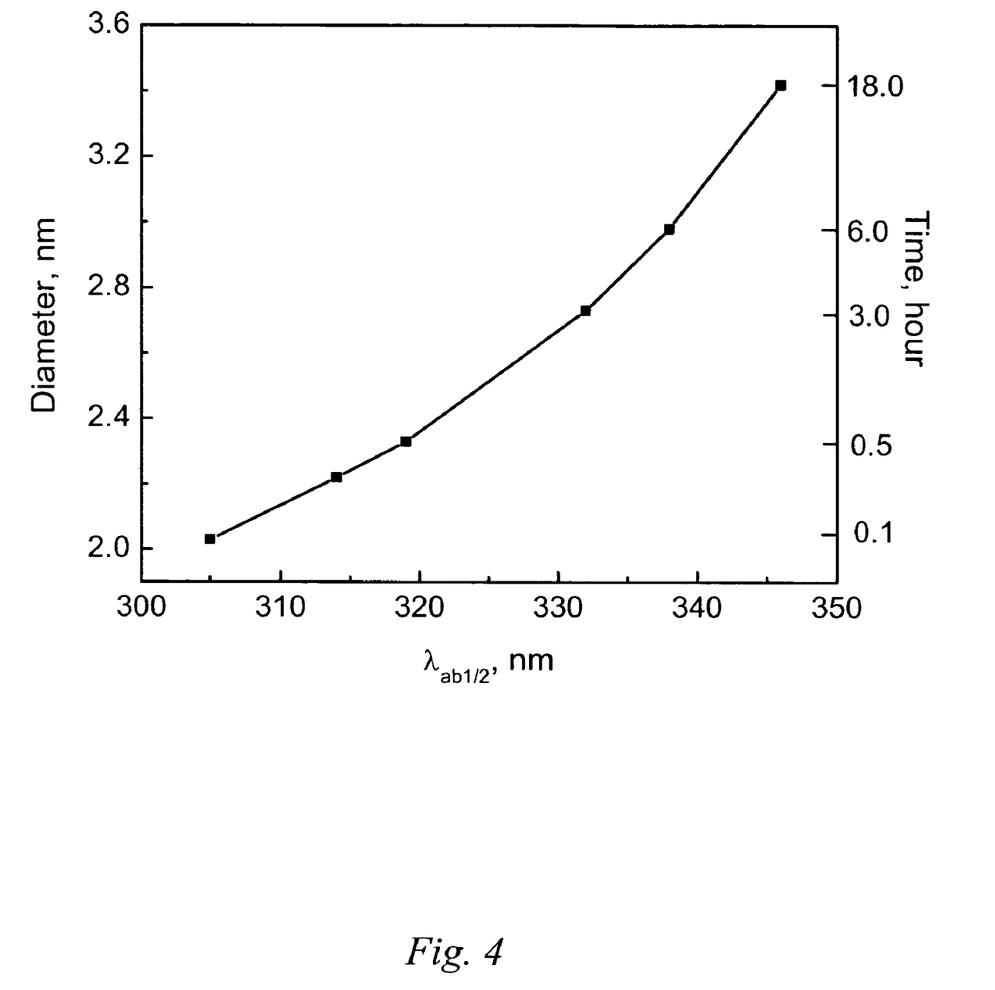
FIG. 4 graphically depicts particle diameter as calculated from absorption measurements corresponding to different reaction times, according to embodiments of the present invention.

There are several ways to calculate particle size from absorption wavelength. An equation provided by Meulenkamp [E. A. Meulenkamp, J. Phys. Chem. B, 102, 5566-5572 (1998)] is used to convert measured values of λ½(the wavelength at which the absorption is the half of that at the shoulder) into particle sizes based on the size determination result from TEM micrographs And XRD line broadening $$1240/\lambda_{1/2} = a + b/D^2 - c/D$$

where a=3.301, b=294.0 and c=–1.09; λ1/2 in nm, diameter D in Å. The above equation was employed to calculate ZnO particle size from the absorption, which is shown in FIG. 4. It is noted that the diameter of the ZnO nanoparticles produced is increased from 2.0 nm to 3.4 nm after 18 hours heating at 60° C. It should be noted that, in Applicant's study, the calculated particle size is slightly smaller than the particle size determined from TEM micrograph, which suggests a slight coagulation of particles. It was previously reported that coagulation rates peak at pH 9.2 for aqueous collidal ZnO[D. W. Bahnemann, C. Kormann and M.R. Hoffmann, J. Phys. Chem., 91, 3789-3798 (1987)]. The literature values for macrocrystalline ZnO give a mean pHzpc (pH of zero point of charge, the coagulation rate is maximum at the pHzpc due to surface electroneutrality) at around 9.0 [G. A. Parks, "The Isoelectric Points of Solid Oxides, Solid Hydroxides, and Aqueous Hydroxo Complex Systems," Chem. Rev., 65, 177-198 (1965)]. Therefore, ZnO nanoparticles obtained in colloidal solution with a pH of around 8-9 are expected to have a relatively high coagulation rate.

Figure 5:
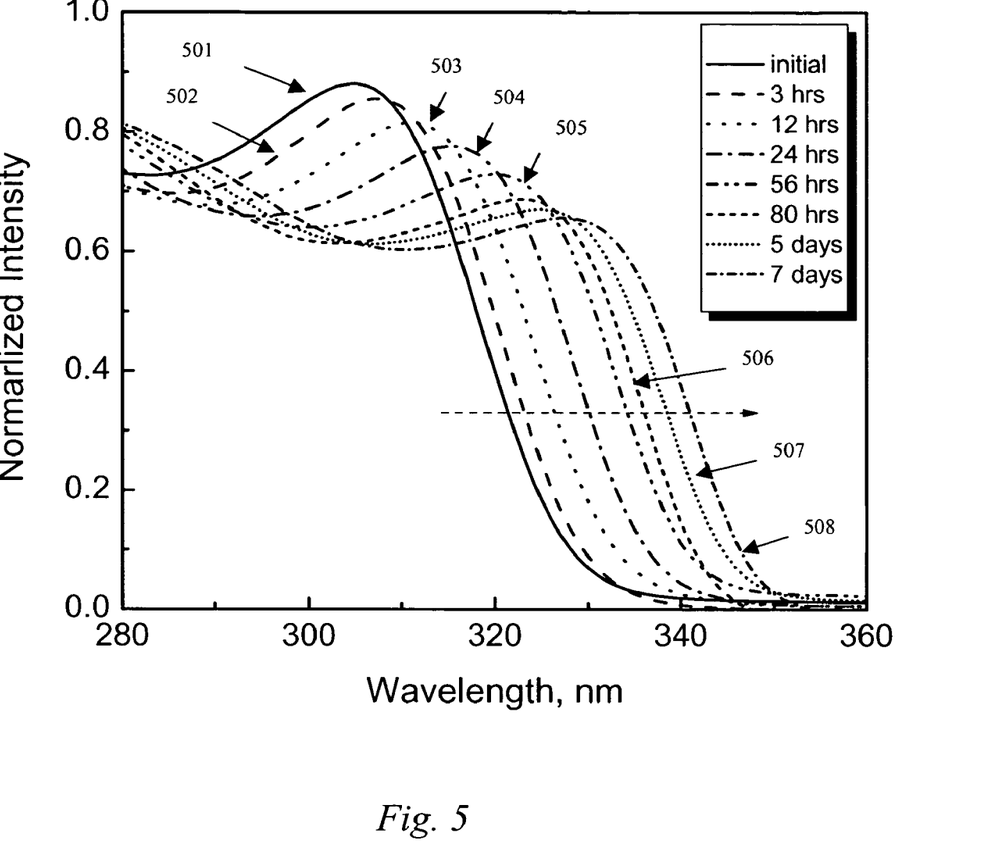
FIG. 5 depicts UV-vis absorption spectra of ZnO colloid aged at 25° C., wherein the ZnO colloid was initially obtained by reaction at 60° C. for 30 minutes.
Figure 6:
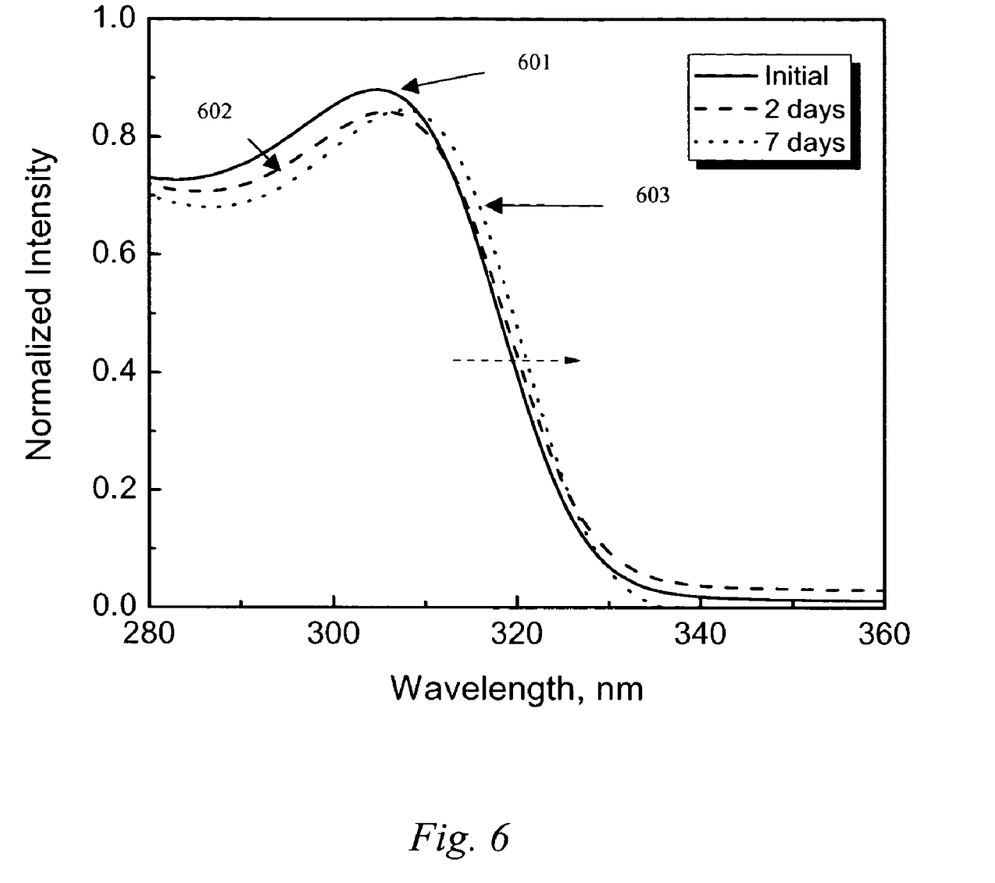
FIG. 6 depicts UV-vis absorption spectra of ZnO colloid aged at −10° C., wherein the ZnO colloid was initially obtained by reaction at 60° C. for 30 minutes.

A transparent ZnO colloid was synthesized at 60° C. for 30 min and was then partitioned into two parts: one that was aged at 25° C., the other stored at −10° C. UV-vis absorption spectra were recorded at various times for both parts during the aging at 25° C. and storage at −10° C., and are shown in FIGS. 5 and 6. FIG. 5 illustrates aging at 25° C., wherein trace 501 is the UV-vis absorption immediately after reaction, trace 502 corresponds to aging 3 hours, trace 503 corresponds to aging 12 hours, trace 504 corresponds to aging 24 hours, trace 505 corresponds to aging 56 hours, trace 506 corresponds to aging 80 hours, trace 507 corresponds to aging 5 days, and trace 508 corresponds to aging 7 days. The $\lambda os$ is seen to steadily red shift from 328 nm toward 348 nm over this aging period of 7 days at 25° C. From this, it is inferred that the diameter of the nanoparticles of ZnO increase from 2.3 nm to 3.3 nm. However, storage at −10° C. for 7 days failed to produce any significant change in the absorption spectra of the ZnO nanoparticle colloid. This is shown in FIG. 6, wherein trace 601 corresponds to the initial UV-vis absorption, trace 602 corresponds to aging for 2 days, and trace 603 corresponds to aging 7 days. Thus, the particle growth is shown to be both temperature and time dependent. As a result, activation and not diffusion-controlled processes occur.

EXAMPLE 4

Luminescence Emission Spectra

Further to the UV-vis spectroscopy in the previous Example, this Example illustrates how emission spectroscopy can be used to monitor and characterize the nano-sized metal oxide particles made according to methods of the present invention.

Most of the literature reports on the luminescence of ZnO involve single crystalline powders or single crystals. In such reports, two emission bands are usually found. The first, a relatively weak and narrow UV emission band, is observed around 380 nm (3.25 eV), just below the onset of absorption. This band is due to the radiative annihilation of excitons. The lifetime of this exciton emission is very short (on the order of several tens to hundreds of picoseconds). See V. V. Travnikov, A. Freiberg and S. F. Savikhin, "Surface Excitons in ZnO Crystals," J. Lumin. 47, 107-112 (1990). The second is a much stronger and broader emission band, situated in the green part of the visible spectrum, with a maximum between 500 and 530 nm (2.35-2.50 eV). In contrast to the exciton emission, the lifetime of the visible emission is much longer, i.e., in the µ-second range. See M. Anpo and Y. Kubokawa, "Photoluminescence of Zinc Oxide Powder as a Probe of Electron-Hole Surface Processes," J. Phys. Chem. 88, 5556-5560 (1984). Experiments on ZnO quantum dots have shown that, compared with good quality ZnO single crystals or ZnO powders, the UV bandgap luminescence in quantum dots is strongly quenched. See L. Spanhel and M. A. Anderson, J. Am. Chem. Soc., 113, 2826-2833 (1991); E. A. Meulenkamp, J. Phys. Chem. B, 102, 5566-5572 (1998); A. Van Dijken, E. A. Meulenkamp, D. Vanmaekelbergh and A. Meijerink, "The Luminescence of Nanocrystalline ZnO Particles: The Mechanism of the Ultraviolet and Visible Emission," J. Lumin., 87, 454-456 (2000). Though it has been observed that the UV band increases slightly with increasing particle size [Van Dijken et al., J. Lumin., 87, 454-456 (2000)], the broad green region is predominant. Anderson et al. observed the green luminescence emission band of a ZnO sol to be shifted from 500 nm to 560 nm after aging. See L. Spanhel and M. A. Anderson, J. Am. Chem. Soc., 113, 2826-2833 (1991). However, there has been no particle growth kinetics work done, as of yet, based on such red shifting of the emission band.

Figure 7:
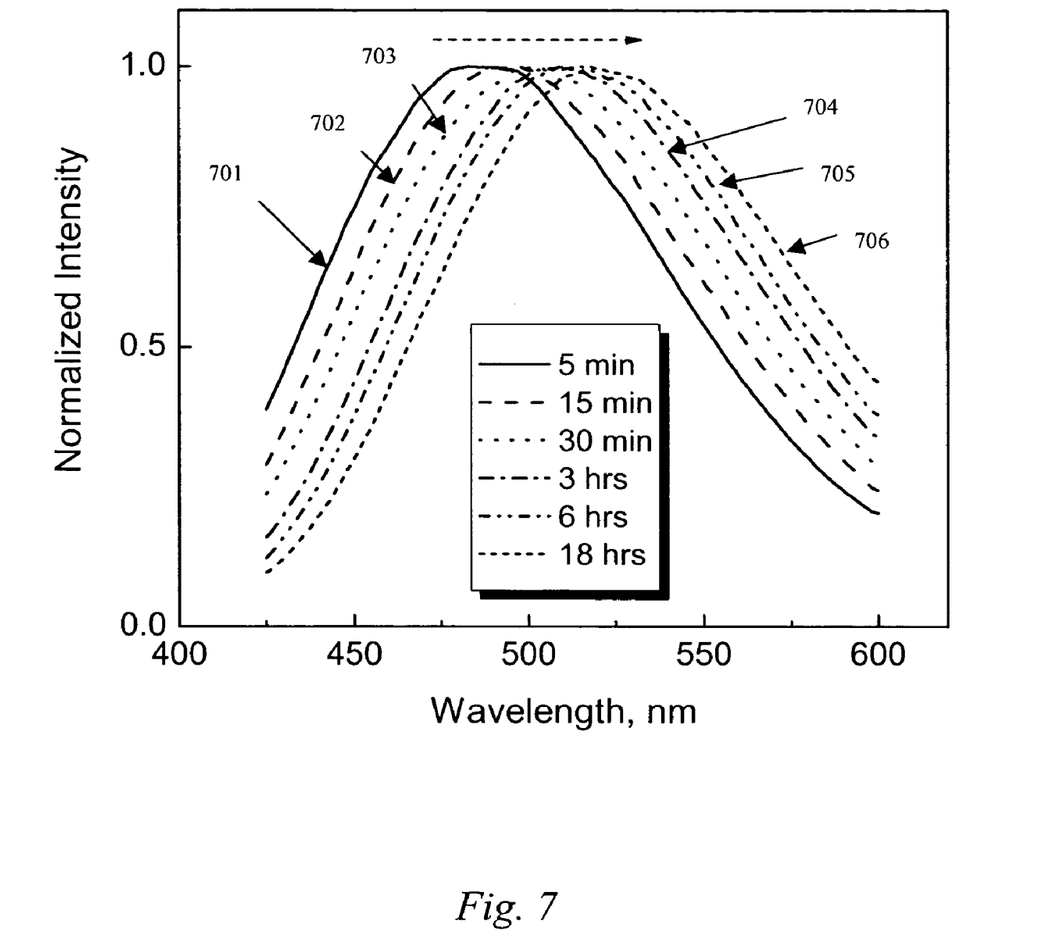
FIG. 7 depicts luminescence spectra, generated at λex=340 nm and normalized to scale, of ZnO colloid formed at 60° C.
Figure 8:
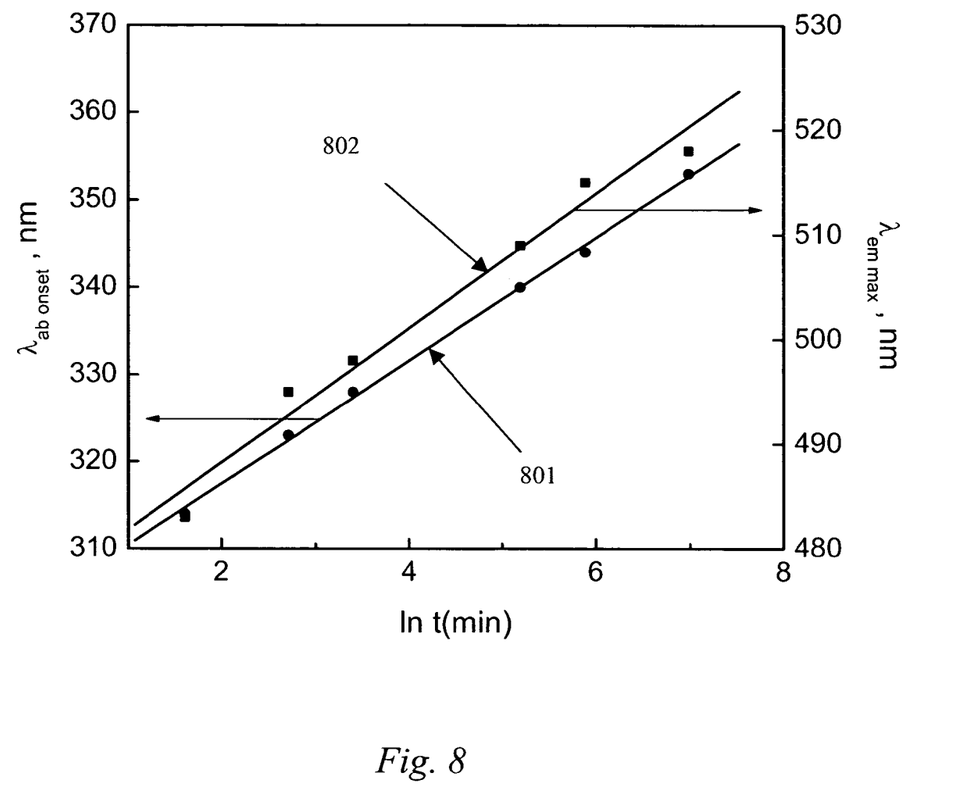
FIG. 8 depicts the time dependence of λab onset and λem max, from UV-vis absorption and green luminescence of ZnO nanoparticles grown at 60° C., according to an embodiment of the present invention.

The emission spectra of the present Example were recorded at various times during the preparation of a stable transparent ZnO colloid at 60° C. The spectra were generated with $\lambda ex = 340$ nm. It was observed that the green luminescence band peaked at 483 nm, after mixing the zinc acetate dihydrate with the base solution for 5 minutes, and then progressively red shifts toward 518 nm during continuous heating and stirring for 18 hours at 60° C. This is shown in FIG. 7, wherein trace 701 corresponds to 5 minutes, trace 702 corresponds to 15 minutes, trace 703 corresponds to 30 minutes, trace 704 corresponds to 3 hours, trace 705 corresponds to 6 hours, and trace 706 corresponds to 18 hours. Plots of the $\lambda os$ of the UV spectra and $\lambda max$ (the wavelength corresponding to the maximum band) of the green luminescence spectra as a function of logarithmic time are shown in FIG. 8 for the zinc acetate dihydrate/KOH/MeOH system heated at 60° C., wherein plot 801 corresponds to the absorption data and plot 802 corresponds to the luminescence (emission) data. Both $\lambda os$ of UV and $\lambda max$ of green luminescence show a similar linear dependence with logarithmic time. Therefore, the green luminescence band can be also used to investigate the time dependence of ZnO nanoparticle growth.

Figure 9:
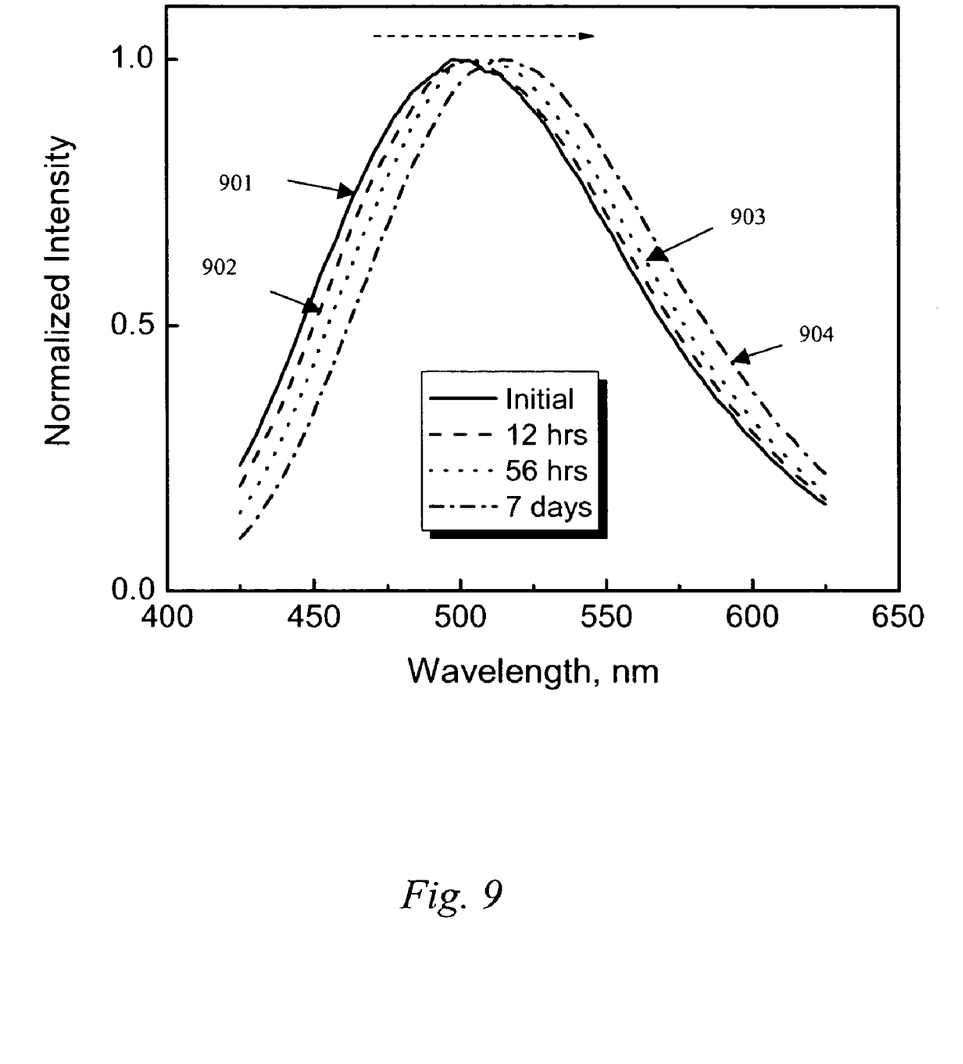
FIG. 9 depicts luminescence spectra, generated at $\lambda_{ex}$=340 nm and normalized to scale, of ZnO colloid aged at 25° C., wherein the ZnO colloid was initially obtained by reaction at 60° C. for 30 minutes.
Figure 10:
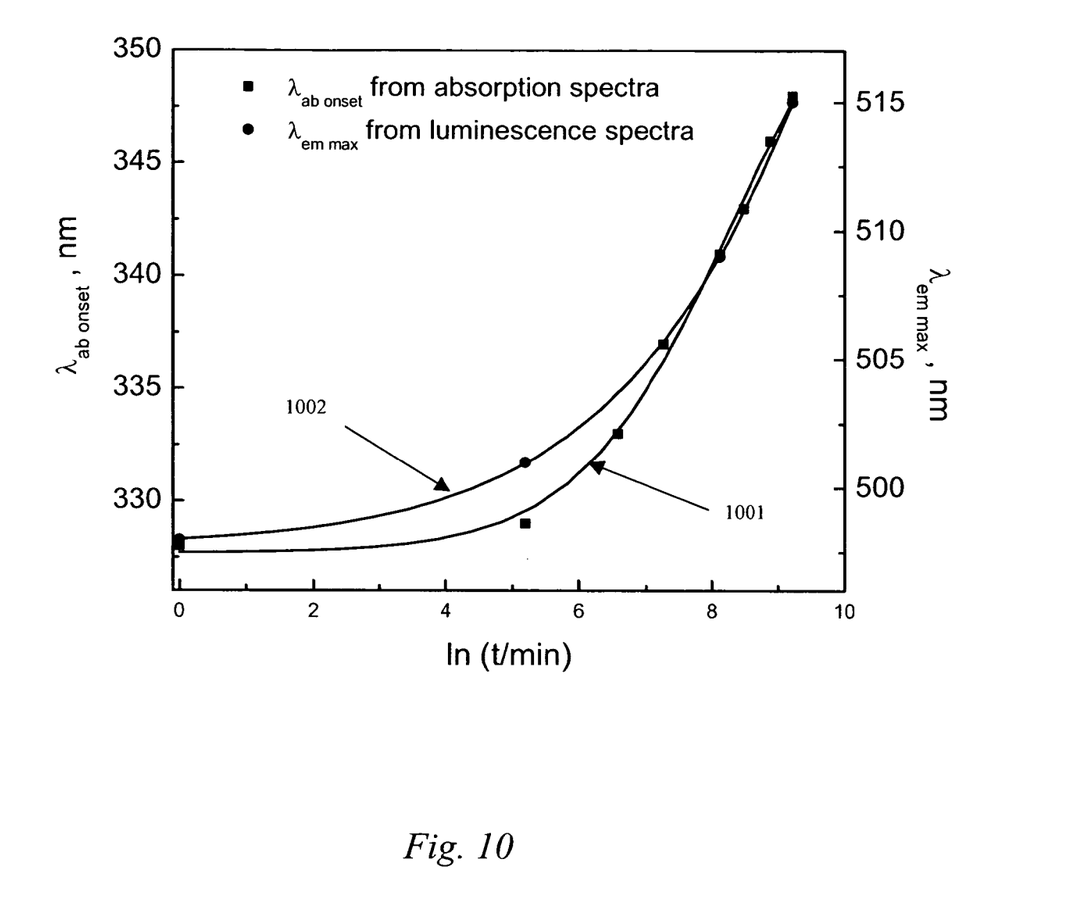
FIG. 10 depicts the time dependence of λab onset and λem max, from UV-vis absorption and green luminescence of ZnO nanoparticles aged at 25° C., according to an embodiment of the present invention.

The transparent ZnO colloids synthesized at 60° C. for 30 minutes were then used as the initial sample for further aging at 25° C. The emission spectra were recorded at various times over the course of the aging process. It was observed that the maximum green emission band readily red shifts from 498 nm to 515 nm, as shown in FIG. 9, wherein trace 901 corresponds to the initial emission spectrum, trace 902 corresponds to aging for 12 hours, trace 903 corresponds to aging for 56 hours, and trace 904 corresponds to aging for 7 days. Plots of the $\lambda os$ of the UV spectra and $\lambda max$ of the green luminescence spectra, as a function of logarithmic time, are shown in FIG. 10, wherein plot 1001 corresponds to the absorption data and plot 1002 corresponds to the luminescence data. It was recognized that the $\lambda os$ of the UV and $\lambda max$ of the green luminescence show a similar trend in terms of their time-dependence. However, when a synthesized ZnO colloid was aged at lower temperature, instead of being heated at the same temperature, the relationship between those absorption and emission band shifts and logarithmic time was not linear at the beginning of the aging. This indicates that simultaneous quenching and reactivation processes may be occurring, wherein the particle growth is quenched when the ZnO colloid was cooled down and consequently needs a relatively longer time to be reactivated.

EXAMPLE 5

This Example, together with COMPARATIVE EXAMPLE 6, illustrate the importance of pH on ZnO nanoparticle formation, as well as the essential order in which reactants must be combined according to at least one embodiment of the present invention.

One hundred ml of 0.2 M KOH in methanol (alcohol-based solution) was prepared and heated at 60° C. with stirring. This solution had pH of 13.1. The solution was then heated up to 60° C. with stirring, and 2.20 g (10 mmol) of Zn(OAc) 2.2H2O powder was added to the solution. The reaction mixture so obtained had a zinc acetate concentration of 0.1M. After stirring continuously for 1 hour, the solution was cooled to 23° C. During the reaction, the pH of the solution was maintained at 7.0 or higher, and the final pH was 9.4. The product was a transparent sol comprising nano-sized ZnO with an average diameter of 3.4 nm.

COMPARATIVE EXAMPLE 6

In contrast to the procedure outlined in EXAMPLE 5, 100 ml of 0.1M Zn(OAc)2.2H2O in methanol (alcohol-based solution) was prepared and heated at 60° C. with stirring. This solution had a pH of 6.3 and a zinc acetate concentration of 0.1M. This solution was heated up to 60° C., under stirring, and 1.13 g (20 mmol) of KOH pellet was added to the solution. After stirring was continued for 1 hour, the system was cooled to 23° C. During the reaction, the pH was observed to increase from 6.3 to 11.7. The solution obtained was turbid, clearly indicating the presence of ZnO particles of much large diameter, i.e., on the order of the wavelength of visible light or greater.

In contrast, it is found that, as described in EXAMPLE 5 and other procedures in accordance with the present invention, metal oxide particles with nanosizes can be obtained with great simplicity and under even higher concentration than that seen in the existing art by mixing metal oxide precursor with alcoholic solution while maintaining pH of 7.0 or higher.

The present invention thus provides a new route of sol-gel synthesis of ZnO and other metal oxide nanoparticles. In particular, ZnO nanoparticles, with sizes on the order of 2-4 nm, were prepared by a simple and efficient method which has also been shown to be successful when employed with several different hydroxide reactants and alcohol solvents. For the nanosized ZnO preparation, the reaction stoichiometry of zinc acetate dihydrate and KOH, and the pH value of the solution and reaction mixture has been shown to affect the yield and effectiveness of the reactions. Excessive OH— in the system is not favorable to the formation of ZnO colloids. The particle size of ZnO can be easily controlled by aging. The particle growth is found to be both time- and temperature-dependent. Together with UV-vis absorption, the green luminescence band can be used to investigate the particle aging kinetics as well. The time dependence of ZnO nanoparticle growth based on green luminescence displays trends similar to that based on UV-vis absorption. However, when the synthesized ZnO colloid was aged at lower temperatures, quenching and reactivation processes may occur. The particle growth was quenched when the ZnO colloid was cooled down (to −10° C.) and may, consequently, need a relatively longer time to be reactivated.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A process comprising the steps of:
   a) preparing an alcohol-based solution comprising:
      i. an alcohol solvent; and
      ii. a basic species, wherein the alcohol-based solution has a pH greater than 7;
   b) adding metal oxide precursor to the alcohol-based solution to form a reaction mixture, wherein the reaction mixture is maintained at a reaction mixture pH greater than 7, wherein the metal oxide precursor comprises a metal component selected from the group consisting of Al, Ti, Fe, Cu, Zn, Ba, Zr, and combinations thereof; and
   c) reacting the reaction mixture to form nanosized metal oxide sol, wherein the reaction mixture is maintained at a reaction mixture pH greater than 7, wherein the nanosized metal oxide sol comprises metal selected from the group consisting of Al, Ti, Fe, Cu, Zn, Ba, Zr, and combinations thereof.

2. The process of claim 1, wherein the alcohol is selected from the group consisting of methanol, ethanol, n-propanol, isopropanol, and combinations thereof.

3. The process of claim 1, wherein the basic species is selected from the group consisting of LiOH, NaOH, KOH, NH4OH, hydrates thereof, and combinations thereof.

4. The process of claim 1, wherein the basic species is dissolved in the alcohol.

5. The process of claim 1, wherein the basic species is present in a molar concentration between about 0.002M and about 2.0M.

6. The process of claim 1, wherein the basic species is present in a molar concentration between about 0.01M and about 0.4M.

7. The process of claim 1, wherein the alcohol-based solution further comprises at least one additional species selected from the group consisting of water, organic solvent, and combinations thereof.

8. The process of claim 7, wherein the additional species comprises the organic solvent and the organic solvent is selected from the group consisting of acetone, methylethyl ketone, tetrahydrofuran, benzene, toluene, o-xylene, m-xylene, p-xylene, mesitylene, diethyl ether, dichloromethane, chloroform, and combinations thereof.

9. The process of claim 1, wherein the pH of the reaction mixture is maintained between about 7 and about 10.5.

10. The process of claim 1, wherein the metal oxide precursor is selected from the group consisting of metal acetates, metal alkoxides, metal halides, metal nitrates, hydrates thereof, and combinations thereof.

11. The process of claim 1, wherein the metal oxide precursor comprises zinc.

12. The process of claim 1, wherein the metal oxide precursor is selected from the group consisting of zinc acetate, zinc acetate dihydrate, and combinations thereof.

13. The process of claim 1, wherein the molar ratio of metal oxide precursor to basic species in the reaction mixture is between about 1:1.2 and about 1:3.

14. The process of claim 1, wherein the step of reacting comprises a reaction temperature that ranges from about 20° C. to about 100° C.

15. The process of claim 1, wherein the step of reacting comprises a reaction duration between about a few seconds and about a few days.

16. The process of claim 1, wherein the step of reacting comprises a reaction duration between about a few minutes and about a few days.

17. The process of claim 1, wherein the nanosized metal oxide sol comprises zinc.

18. The process of claim 1, wherein the nanosized metal oxide sol comprises particles having an average diameter between about 1 nm and about 100 nm.

19. The process of claim 1, wherein the nanosized metal oxide sol comprises particles having an average diameter between about 1 nm and about 50 nm.

20. The process of claim 1, wherein the nanosized metal oxide sol comprises particles having an average diameter between about 1 nm and about 10 nm.

21. The process of claim 1 further comprising a step of adding a dopant species to the alcohol-based solution before adding the metal oxide precursor, so as to provide for doped nanosized metal oxide particles.

22. The process of claim 21, wherein the sol is stored at a temperature that precludes agglomeration.

\* \* \* \* \*